No. 636,701. Patented Nov. 7, 1899.
W. E. WENTZEL & G. E. WHITNEY.
VEHICLE DRIVING MECHANISM.
(Application filed June 9, 1899.)
(No Model.)
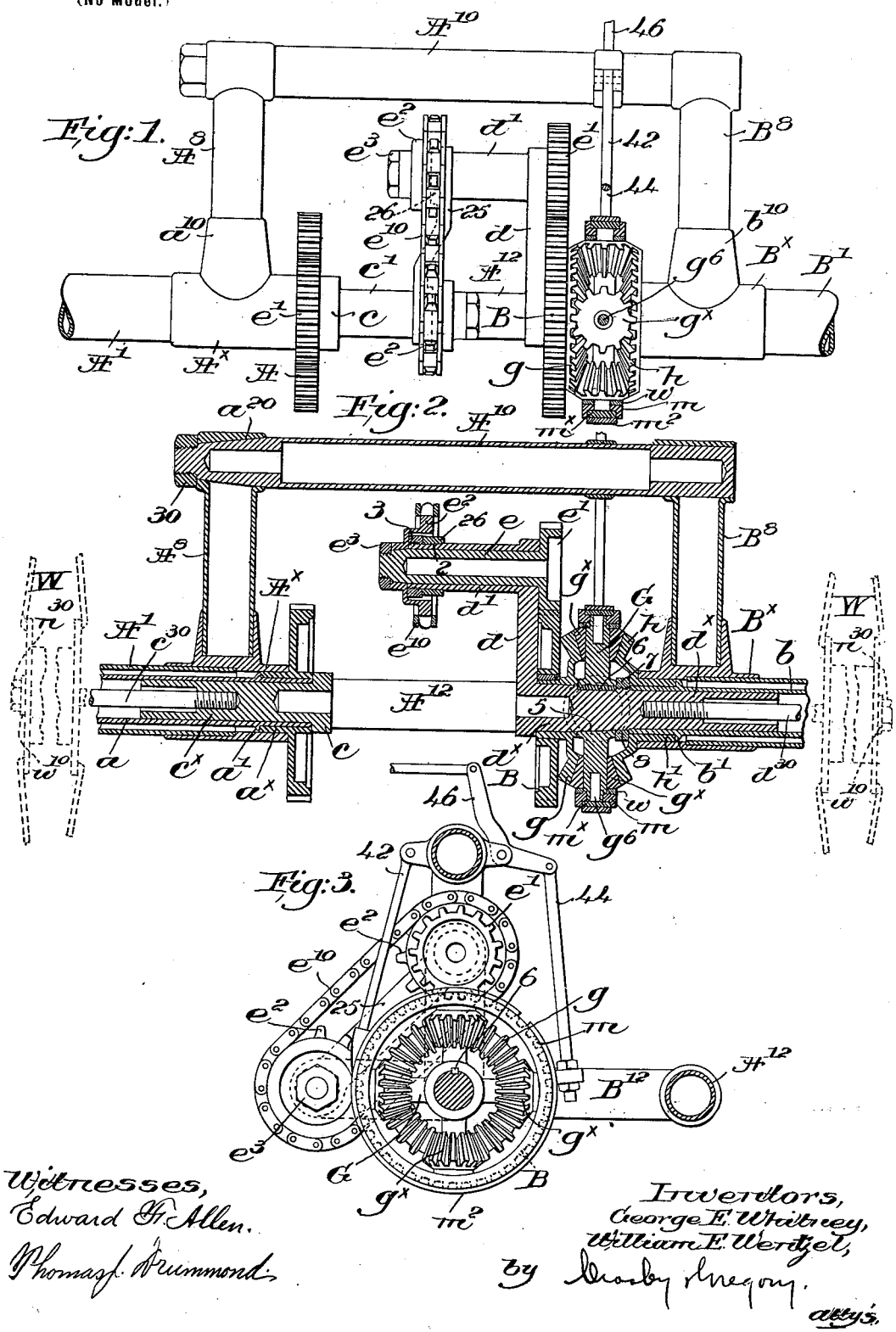
Witnesses,
Edward F. Allen.
Thomas F. Drummond.
Inventors,
George E. Whitney,
William E. Wentzel,
by Crosby Gregory
attys.

UNITED STATES PATENT OFFICE.

WILLIAM E. WENTZEL, OF LYNN, AND GEORGE E. WHITNEY, OF BOSTON, MASSACHUSETTS, ASSIGNORS TO THE WHITNEY MOTOR WAGON COMPANY, OF KITTERY, MAINE.

VEHICLE DRIVING MECHANISM.

SPECIFICATION forming part of Letters Patent No. 636,701, dated November 7, 1899.

Application filed June 9, 1899. Serial No. 719,887. (No model.)

*To all whom it may concern:*

Be it known that we, WILLIAM E. WENTZEL, of Lynn, county of Essex, and GEORGE E. WHITNEY, of Boston, county of Suffolk, State of Massachusetts, have invented an Improvement in Vehicle Driving Mechanism, of which the following description, in connection with the accompanying drawings, is a specification, like letters and figures on the drawings representing like parts.

This invention relates to driving mechanism, and more particularly to such mechanism as applied to motor-vehicles or automobiles; and it has for its broad object the production of a crank member and compensating driving connections between it and a pair of driving-wheels, whereby differential movement of the wheels is permitted when necessary, as when the vehicle is turning corners.

The utilization of a crank member for transmitting the power of the motor to the driving-wheels of a vehicle is productive of numerous advantages, such as the very direct application of power and the avoidance of a sprocket-chain or similar power-transmitting device; but, so far as we are aware, the combination of a crank member with compensating mechanism is broadly new, and while we have herein shown one very effective and practical embodiment of our invention the same is not restricted to the particular construction and arrangement shown and described.

Inasmuch as our present invention comprehends only the driving-shaft and its immediately coöperating or related parts, we have not illustrated other portions of a vehicle unnecessary to a full understanding of our invention.

The various novel features of our invention will be hereinafter fully described, and particularly pointed out in the claims.

Figure 1 is a front elevation of a crank-shaft and coöperating compensating mechanism embodying one form of our invention with the inner bearings and their connecting trusses suitable for use in a motor-vehicle. Fig. 2 is a longitudinal sectional view thereof through the center of the shaft; and Fig. 3 is a partial cross-section thereof on the line $x\ x$, Fig. 1, the bevel-pinions of the compensating mechanism being shown in elevation and illustrating clearly the brake mechanism to be described.

We have herein shown the shaft as comprising an intermediate crank member and coöperating like tubular members $a$ and $b$, separated one from the other at their inner ends and at their outer ends securely attached in suitable manner to the driving-wheels W, (partially shown in dotted lines, Fig. 2,) said members near their inner ends having external annular shoulders $a'\ b'$, respectively.

The crank member herein shown is double— that is, has two like cranks $c$ and $d$ at right angles to each other, (see Fig. 3,) and having oppositely extended from their inner faces tubular crank-pins $c'\ d'$, the ends $c^\times\ d^\times$ of said crank member extending snugly into the inner ends of but rotatively movable relative to the tubular members $a$ and $b$.

The ends of the crank member extend well into the tubular members and preferably beyond the bearings to be described, and in order to obviate the use of two cranks for each crank-pin, while maintaining the necessary rigid connection between the parts of the crank member, and for other reasons, to be referred to, we provide a distance-bar 25, Figs. 1 and 3, having an eye or hub 26 at each end, which is driven tightly onto a tapered portion 2 of each crank-pin, (see Fig. 2,) the bar being bent between its ends, as shown in Fig. 1, as the inner end of the crank-pins extend oppositely beyond each other. A nut 3, screwed upon the threaded end of each pin, against the hub of the distance-bar, holds it securely in place on the tapered portion 2.

Each crank-pin has extended through it a shaft $e$, Fig. 2, preferably hollowed out to lighten it and having secured to or formed upon it at one end a spur-gear $e'$, which rests against the outer face of the crank, the opposite end of the shaft projecting beyond the pin being externally tapered at 4 to receive upon it the hub of a suitable sprocket $e^2$, held securely in place by a nut $e^3$, screwed onto the reduced and threaded extremity of the shaft, the latter being movable bodily with the crank-pin and at times rotating therein, a sprocket-chain $e^{10}$ connecting said sprockets.

The spur-gear $e'$, carried by the crank-pin $c'$, is in mesh with a large gear A, rigidly secured to the tubular member $a$ between its shoulder $a'$ and the adjacent crank $c$, the elongated hub $a^\times$ of said gear entering a cylindrical bearing $A^\times$, forming a part of the frame of the vehicle and to be described, the said bearing supporting the driving-shaft at one side of the crank member thereof. This bearing has brazed onto it a hollow sleeve $A'$, extended concentric to the shaft of the wheel-hub and provided at its outer end with any suitable or usual form of bearing (not shown) to support the tubular shaft member $a$ adjacent the wheel, this sleeve forming, with the like sleeve $B'$ at the opposite end of the shaft, a part of the frame of the vehicle in the present embodiment of our invention.

The shaft end $d^\times$ of the crank member has loosely mounted upon it adjacent the crank $d$ a bevel-gear $g$, forming part of the compensating mechanism proper, a large gear B, keyed or otherwise secured to said bevel-gear, meshing with the spur-gear $e'$, carried by the crank-pin $d'$, and beyond the hub of the gear $g$ the shaft end $d^\times$ is outwardly tapered at 5, Fig. 2, to receive the hub of a gear-carrier or spider G, tightly forced upon the tapered portion and further held securely by a key 6.

We have shown the spider as having four radial arms, near the outer ends of which are rotatably mounted bevel-pinions $g^\times$, which mesh with the bevel-gear $g$ and also with an opposed like gear $h$, the inner end of its hub resting against a nut 7, screwed onto a threaded part 8 of the shaft end $d^\times$ against the spider, the bevel-gears $g$ and $h$ and the spider, with its bevel-pinions, forming compensating mechanism proper, the hereinbefore-described devices between the gear $g$ and the left-hand wheel, Fig. 2, connecting the latter, through the crank member, with the compensating mechanism proper.

The bevel-gear $h$ has an elongated hub $h'$, which enters and rotates in the bearing $B^\times$, said hub abutting against the shoulder $b'$ of and being securely attached to the tubular shaft member $b$, the bearings $A^\times$ and $B^\times$ preventing outward movement of the two parts of the crank member. The bearings are provided with hollow bosses $a^{10} b^{10}$ on their upper sides, into which are brazed upright hollow standards $A^8 B^8$, connected at their upper ends by a cross-bar $A^{10}$, shown as hollow, it with the standards constituting a truss form of connection between the bearings. A similar truss connection $A^{12} B^{12}$, Fig. 3, is secured to the bearings at the back thereof and substantially at right angles to the upright truss, the two trusses serving to support with the proper strength and stiffness the inner bearings for the driving-shaft.

We have not shown any driving-motor herein, it being understood that the connecting-rods leading from the motor will be attached to the crank-pins $c' d'$ of the shaft, the rotative motion being applied to the crank member of the shaft.

When the vehicle is going in a straight path, the wheel-carrying members $a b$ rotate in unison with each other and with the crank member, as at such time the bevel-gears $g$ and $h$ will be locked together by the bevel driving-pinions $g^\times$, as is common in compensating mechanism of this type, the connections described between the gears A and B causing them to rotate in unison to thereby rotate the wheel-carrying members. When, however, the vehicle is turning a corner or traveling in a curved path, the outer driving-wheel will travel faster than the inner one, and at such time the compensating mechanism and the transmitting connections between the gears A and B will operate, as will be manifest from an inspection of the drawings. If the left-hand wheel (indicated in Fig. 2) is traveling slower than the right-hand wheel, the gear A will be retarded, rotating its meshing gear $e'$ and the connected sprocket $e^2$ on the crank-pin $c'$, the sprocket-chain $e^{10}$ transmitting such rotation to the sprocket $e^2$ on the crank-pin $d'$, and thereby to the gear $e'$ in mesh with the gear B, and the latter will be retarded or held back to the same extent as the gear A, so that the bevel-gear $g$ will rotate more slowly than its opposed bevel-gear $h$. If the left-hand wheel travels faster than the right-hand wheel, then the gears A and B and the bevel-gear $g$ will rotate faster than the gear $h$, and the difference in the speed of the driving-wheels will be compensated for.

For convenience in assembling the parts the cross-bar $A^{10}$ of the truss is preferably permanently secured by a brazed or other suitable joint to one of the standards, as $B^8$, and enters the boss at the upper end of the standard $A^8$ on a taper, as shown at $a^{20}$ in Fig. 2, a retaining-nut 30 holding the cross-bar and standard securely together. The distance-bar 25 passes from one crank-pin to the other between the runs of the sprocket-chain, as clearly shown in Figs. 1 and 3, without in any way interfering with the chain.

We have devised a very powerful brake adapted to be applied to a part carried by the actuating or crank member of the driving-shaft, and to this end the outer ends of the spider G beyond the pinions $g^\times$ are reduced in diameter, as at $g^6$, and provided with washers $w$, and outside of the latter an annularly-grooved rim $m$ is secured to the ends of the spider-arms, the annular groove in the periphery of the rim having secured within it a wooden or other suitable friction-surface $m^\times$. A flexible metallic brake-band $m^2$ surrounds and coöperates with the friction-surface of the rotatable brake member, a rod 42 holding the band in place, operation of the band being effected by a link 44, connected at its upper end with a suitable actuating-lever 46, as shown in Fig. 2. The brake action is thus applied directly to the driving member of the compensating mechanism and serves to retard or stop the movement of the vehicle in a very efficient and powerful yet simple manner.

The alined portions $c^\times$ and $d^\times$ of the crank member are shown in Fig. 2 as threaded to receive the threaded ends of rods $c^{30}$ $d^{30}$, respectively, said rods passing through the tubular shaft members and loosely through the wheel-hubs, and beyond the latter a washer $w^{10}$ is fitted onto the projecting end of each rod and held in place by a nut $n^{30}$. Longitudinal displacement of the shaft members is thus prevented, in addition to the action of the truss portions of the frame hereinbefore referred to.

Our invention is not restricted to the precise construction and arrangement of parts as herein shown, for the same may be modified in various particulars without departing from the spirit and scope of our invention.

Having described our invention, what we claim as new, and desire to secure by Letters Patent, is—

1. A pair of driving-wheels, a crank, and compensating driving connections between said crank and wheels, to at times permit differential rotation of the latter.

2. A pair of driving-wheels, an intermediate crank rotatable relative to the wheels, and compensating driving connections between said crank and wheels, to permit differential rotation of the latter.

3. A pair of driving-wheels, an intermediate crank rotatable relative to the wheels, compensating means between and connecting the crank and one of the wheels, and driving connections between the other wheel and the compensating means, transmitted through the crank.

4. A pair of driving-wheels, an intermediate crank rotatable relative to the wheels, compensating means, the actuating member thereof rotating with the crank, direct connections between said compensating means and one of the wheels, and driving connections between said means and the other wheel, transmitted through the crank.

5. A pair of driving-wheels, an intermediate crank member in alinement with and rotatably movable relative to the wheel-axes, compensating mechanism driven by the crank member, including a bevel-gear rotatable with each wheel, and driving connections between one of the wheels and a bevel-gear, transmitted through the crank member.

6. A vehicle driving-shaft having a crank, wheels mounted upon the shaft, and compensating mechanism connective of the shaft and wheels to permit differential rotation of the latter.

7. A vehicle driving-shaft comprising wheel-carrying members, an intermediate crank member rotatably movable relative to the wheel-carrying members, and compensating mechanism connective of said wheel-carrying members and the crank member, whereby differential rotation of the wheel-carrying members is permitted.

8. A vehicle driving-shaft comprising wheel-carrying members, an intermediate crank-driving member rotatably movable relative to the wheel-carrying members, compensating mechanism connective of said members and the crank member, and a rod extended from each end of the crank member through the wheel-hubs, to prevent longitudinal displacement of the parts.

9. A vehicle driving-shaft comprising tubular members each having a wheel rigidly attached to it, an intermediate crank member supported in the inner ends of said tubular members and rotatably movable relatively thereto, and compensating driving connections between the crank and wheel-carrying members, to normally effect rotation of the latter in unison.

10. A vehicle driving-shaft comprising separated members each having a wheel rigidly attached thereto, and immediate crank member, compensating mechanism, including a spider fast on the crank member and provided with bevel-pinions, opposed bevel-gears one of which is fast on the adjacent wheel-carrying member and the other loosely mounted on the crank member, a gear fast on the other wheel-carrying member, and driving connections between said fast gear and the loose bevel-gear mounted on the crank member.

11. A pair of driving-wheels, an intermediate double-crank member rotatable relative thereto, and compensating driving connections between the wheels and crank member, including a rotatable sprocket-wheel carried by each crank-pin, and a sprocket-chain connecting said sprocket-wheels.

12. A vehicle driving-shaft comprising wheel-carrying members having a wheel rigidly secured to each, compensating mechanism intermediate said members, a driving-crank between the compensating mechanism and one of the wheels, and means to transmit the action of the compensating mechanism to the wheel beyond the crank.

13. A pair of driving-wheels, a truss provided with bearings for the wheels, a crank intermediate the wheels, and compensating driving connections between said crank and wheels.

14. Wheel-carrying members having each a rigidly-attached driving-wheel, a truss provided with bearings for said members and having tubular extensions through which said members are extended, a crank driving member, and compensating driving connections between the crank and wheel-carrying members, to permit differential rotation of the wheels.

15. A pair of driving-wheels, connected trusses at substantially right angles to each other and provided with bearings for the wheels, a crank member between said bearings, and compensating driving connections between the crank member and the wheels.

16. A pair of driving-wheels, two driving-cranks intermediate said wheels and having oppositely-extended crank-pins, a distance-bar rigidly connecting the outer ends of the pins, and compensating driving connections between the cranks and the wheels, to effect rotation thereof in unison and also to permit differential rotation of the wheels.

17. A driving-shaft having a crank member, compensating mechanism, and means to transmit the differential action of the compensating mechanism through the crank member of the shaft.

18. In a motor-vehicle, driving-wheels, a driving-shaft having a crank member, compensating mechanism, means to transmit the differential action of the compensating mechanism through the crank member of the shaft, and means to transmit rotary motion from the driving-shaft to the driving-wheels.

19. A vehicle driving-shaft comprising a double-crank member, tubular wheel-carrying members, a sprocket, its shaft, and a gear, mounted rotatably upon said crank-pin, a chain connecting the sprockets, a large gear in mesh with each of said gears, one of the large gears being fast on a tubular member, the other having a rigidly-connected bevel-gear loose on the crank member of the shaft, an opposed bevel-gear fast on the other tubular member, and a spider fast on the crank member, having bevel-pinions in continuous engagement with the opposed bevel-gears.

20. In a motor-vehicle, a driving-shaft comprising tubular members, a wheel fast on the outer end of each, an intermediate crank member supported in the inner ends of and rotatably movable relative to the tubular members, a tie-rod extended from each end of the crank member through the adjacent tubular member and the hub of its wheel, to prevent longitudinal displacement of the parts, compensating mechanism connecting the tubular and crank members, shaft-bearings, one at the inner end of each tubular member, and trusses substantially at right angles to each other connecting said bearings around the crank member.

In testimony whereof we have signed our names to this specification in the presence of two subscribing witnesses.

WILLIAM E. WENTZEL.
GEORGE E. WHITNEY.

Witnesses:
GEORGE B. UPHAM,
NATHANIEL H. COOLEDGE.

It is hereby certified that in Letters Patent No. 636,701, granted November 7, 1899, upon the application of William E. Wentzel, of Lynn, and George E. Whitney, of Boston, Massachusetts, for an improvement in "Vehicle Driving Mechanism," an error appears in the printed specification requiring correction, as follows: In line 93, page 3, the words " and immediate " should read *an intermediate;* and that the said Letters Patent should be read with this correction therein that the same may conform to the record of the case in the Patent Office.

Signed, countersigned, and sealed this 12th day of December, A. D., 1899.

THOS. RYAN,

[SEAL.]

*First Assistant Secretary of the Interior.*

Countersigned:
    C. H. DUELL,
        *Commissioner of Patents.*